United States Patent
Winters

(10) Patent No.: US 9,479,827 B2
(45) Date of Patent: Oct. 25, 2016

(54) CHANNEL SCANNING BASED UPON INTERLEAVER DEPTH

(71) Applicant: ARRIS Enterprises, Inc., Suwanee, GA (US)

(72) Inventor: Derek Alan Winters, Suwanee, GA (US)

(73) Assignee: ARRIS Enterprises, Inc., Suwanee, GA (US)

( * ) Notice: Subject to any disclaimer, the term of this patent is extended or adjusted under 35 U.S.C. 154(b) by 6 days.

(21) Appl. No.: 14/519,683

(22) Filed: Oct. 21, 2014

(65) Prior Publication Data

US 2016/0112756 A1    Apr. 21, 2016

(51) Int. Cl.
| H04N 21/438 | (2011.01) |
| H04N 21/426 | (2011.01) |
| H04N 21/443 | (2011.01) |

(52) U.S. Cl.
CPC .... H04N 21/4383 (2013.01); H04N 21/42638 (2013.01); H04N 21/4382 (2013.01); H04N 21/4384 (2013.01); H04N 21/4432 (2013.01)

(58) Field of Classification Search
CPC ............ H04N 21/4383; H04N 21/4382; H04N 21/44008; H04N 21/4305; H04N 21/4384
USPC ......................................................... 375/240
See application file for complete search history.

(56) References Cited

U.S. PATENT DOCUMENTS

| 6,714,262 | B1* | 3/2004 | Tsurumi ................ H03J 1/0066 348/726 |
| 6,948,184 | B1* | 9/2005 | Del Sol et al. ................ 725/111 |
| 6,971,057 | B1* | 11/2005 | Delvaux ........... H03M 13/2732 714/702 |
| 7,849,380 | B2* | 12/2010 | Markman et al. ............ 714/760 |
| 2010/0332941 | A1* | 12/2010 | Gilson ........................... 714/762 |
| 2011/0310982 | A1* | 12/2011 | Yang et al. .............. 375/240.26 |
| 2013/0064333 | A1* | 3/2013 | Mori ....................... H04L 7/042 375/343 |
| 2015/0093999 | A1* | 4/2015 | Giardino ................ H04H 20/78 455/71 |

OTHER PUBLICATIONS

Data Standards Subcommittee, "Downstream RF Interface for Cable Modem Termination Systems", 2007, http://www.scte.org/documents/pdf/standards/ANSI_SCTE1332007FinalEdits.pdf, p. 1 and p. 10-11.*

* cited by examiner

*Primary Examiner* — Brian T Pendleton
*Assistant Examiner* — Frank Johnson-Calderon
(74) *Attorney, Agent, or Firm* — Bart A. Perkins

(57) ABSTRACT

Methods, systems, and computer readable media can be operable to distinguish between data signals and video signals based upon interleaver depths associated with the signals. A CPE device can identify an interleaver depth associated with a signal and can make the determination that the signal is a video signal when the interleaver depth is outside of a predetermined range, the predetermined range being based on interleaver depths that are expected for a data signal.

20 Claims, 4 Drawing Sheets

CHANNEL SCANNING BASED UPON INTERLEAVER DEPTH

TECHNICAL FIELD

This disclosure relates to filtering signals during channel scanning.

BACKGROUND

Typically, on a cable transmission plant, there is a mix of video signals (e.g., quadrature amplitude modulation (QAM) signals carrying video and audio frames for providing traditional television services) and data signals (e.g., Data Over Cable Service Interface Specification (DOCSIS) QAM signals providing data-over-cable services). When a customer premise equipment (CPE) device powers up, the CPE device must, in general, first find a frequency through which to receive a downstream signal. In embodiments, the CPE device operates at a greater efficiency when the downstream signal is a data signal (e.g., a downstream DOCSIS QAM signal).

In order to find a downstream data signal, the CPE device needs to distinguish data signals from video signals. CPE devices typically distinguish data signals from video signals by analyzing one or more packet identifiers (PID) associated with the frames carried by the signal. For example, when the CPE device analyzes a PID and identifies the PID as a PID associated with video (e.g., a Moving Picture Experts Group (MPEG) PID), the CPE device can make the determination that the signal is a video signal. However, in order to identify a PID within a signal, the CPE device generally must lock onto the signal (e.g., acquire QAM lock), decode and check parity of the signal through error correction (e.g., acquire forward error correction (FEC) lock), and acquire a lock onto a transmission convergence layer (e.g., MPEG) associated with the signal (e.g., by decoding an MPEG frame within the signal). This process for identifying and analyzing a PID is time-consuming. Therefore, a need exists for improving methods and systems for scanning for and locking onto downstream data signals.

BRIEF DESCRIPTION OF THE DRAWINGS

Like reference numbers and designations in the various drawings indicate like elements.

DETAILED DESCRIPTION

It is desirable to improve upon methods and systems for scanning for and locking onto a downstream data signal (e.g., DOCSIS QAM signal). Methods and systems are described herein for distinguishing between data signals and video signals based upon interleaver depths associated with the signals. A CPE device can identify an interleaver depth associated with a signal and can make the determination that the signal is a video signal when the interleaver depth is outside of a predetermined range, the predetermined range being based on the interleaver depth that is expected for a data signal.

Figure 1:
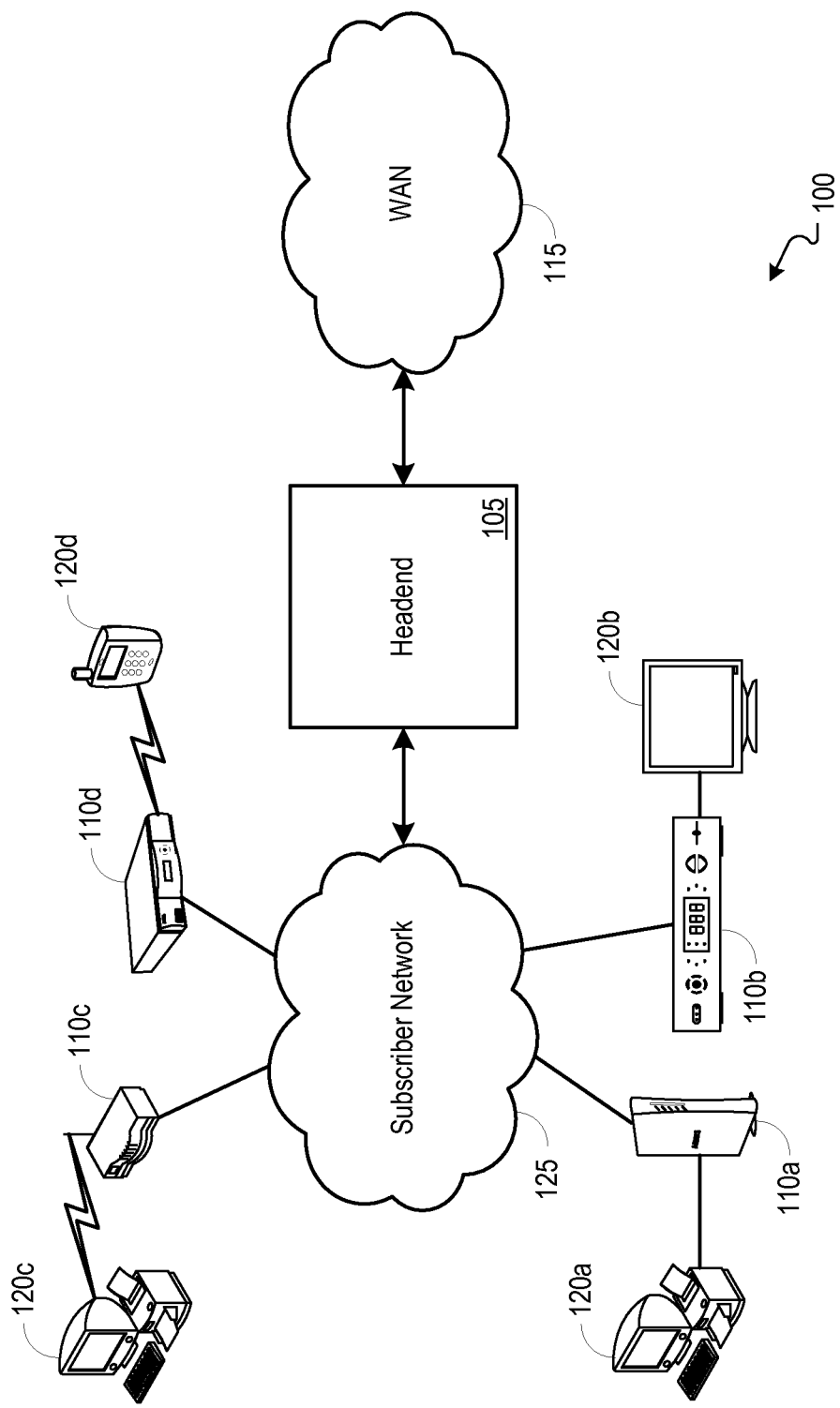
FIG. 1 is a block diagram illustrating an example network environment operable to facilitate the distinguishing of video signals from data signals based upon an interleaver depth associated with the signals.

FIG. 1 is a block diagram illustrating an example network environment 100 operable to facilitate the distinguishing of video signals from data signals based upon interleaver depths associated with the signals. In embodiments, a headend 105 delivers video service(s) and/or data service(s) to one or more customer premise equipment (CPE) devices 110a-d from a wide area network (WAN) 115. The CPE devices can include, for example, a modem 110a, a set-top box 110b, a wireless router including an embedded modem 110c, or a media gateway 110d, among many others (e.g., digital subscriber line (DSL) modem, voice over internet protocol (VOIP) terminal adapter, video game console, digital versatile disc (DVD) player, communications device, hotspot device, etc.).

The CPE devices 110a-d can facilitate communications between the WAN 115 and client devices 120a-d. A cable modem or embedded multimedia terminal adapter (eMTA) 110a can facilitate communications between the WAN 115 and a computer 120a. A set-top box 110b can facilitate communications between the WAN 115 and a television 120b or a digital video recorder (DVR). A wireless router 110c can facilitate communications between a computer 120c and the WAN 115. A gateway 110d can facilitate communications between a mobile device 120d and the WAN 115.

In embodiments, the headend 105 can deliver video service(s) and/or data service(s) to the one or more CPE devices 110a-d through a subscriber network 125. The subscriber network 125, for example, can be a hybrid fiber-coaxial (HFC) network, a local area network (LAN), a wireless local area network (WLAN), a cellular network, a personal area network (PAN), as well as others.

In embodiments, prior to delivering a video or data service to a CPE device 110a-d, the headend 105 manipulates a stream of packets associated with the video or data service to minimize the effects on the quality of the video or data service that may result from possible interferences or interruptions in the delivery of the packet stream. For example, the headend 105 can use an error correction process (e.g., forward error correction (FEC)) and/or interleaving in an effort to better distribute the negative effects of interference (e.g., a noise burst) over a stream of packets. When a packet stream is received at the headend 105, the headend 105 can interleave the packet stream by dividing stream components (e.g., bits, symbols, codewords, etc.) into a predetermined number of sub-components and rearranging the order of the sub-components by separating sequential stream sub-components by a predetermined number of sub-components. The number by which each stream component is divided (e.g., the number of sub-components associated with each stream component) can be referred to as the interleaver depth of the stream.

Interleaver depth can have varying effects on the interleaved stream. For example, a greater interleaver depth can provide better durability for the stream while creating a higher latency in the transmission of the stream. As a result of the various benefits and trade-offs associated with interleaver depth, the headend 105 can interleave different types of signals using different interleaver depths. For example, data signals, such as DOCSIS QAM signals, can have interleaver depths that are within a specific range, and video signals, such as video QAM signals, can have greater interleaver depths than data signals.

In embodiments, when a CPE device 110a-d receives a signal from the headend 105, the CPE device 110a-d identifies an interleaver depth associated with the received signal. For example, the CPE device 110a-d can identify the interleaver depth during an identification of error correction parameters associated with the received signal (e.g., acquisition of an FEC lock on the received signal). The interleaver depth can be identified from a code word contained in an FEC frame sync trailer associated with the received signal.

In embodiments, the CPE device 110a-d can determine whether an identified interleaver depth is within a predetermined range. The predetermined range can be based upon an expected interleaver depth associated with a downstream data signal. For example, the predetermined range can be a range of interleaver depths that a DOCSIS QAM signal can have. The low end of the predetermined range can be the minimum interleaver depth for a DOCSIS QAM signal and the high end of the predetermined range can be the maximum interleaver depth for a DOCSIS QAM signal. When the CPE device 110a-d identifies an interleaver depth that is outside of the predetermined range, the CPE device 110a-d can terminate its lock on the corresponding signal and acquire a lock onto another downstream signal.

Figure 2:
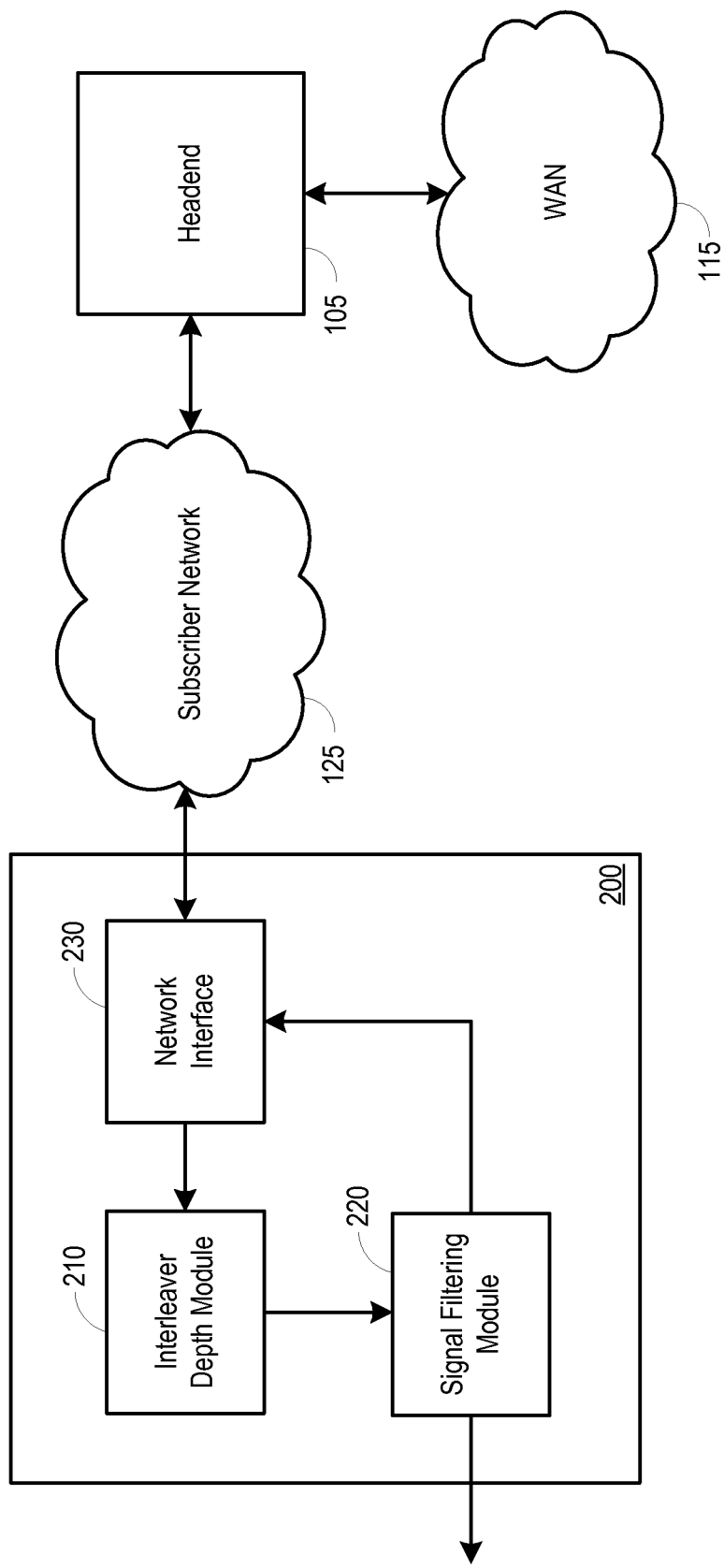
FIG. 2 is a block diagram illustrating an example component operable to distinguish between video signals and data signals based upon an interleaver depth associated with the signals.

FIG. 2 is a block diagram illustrating an example component 200 operable to distinguish between video signals and data signals based upon interleaver depths associated with the signals. The component 200 can include an interleaver depth module 210, a signal filtering module 220, and a network interface 230. In embodiments, the component 200 is within a CPE device (e.g., CPE device 110).

In embodiments, the component 200 receives and locks onto a downstream signal through the network interface 230. For example, a downstream signal can be received through a subscriber network 125 from a headend 105, and the downstream signal can provide a CPE device 110 with a data service and/or video service from a WAN 115. In embodiments, the network interface 230 is operable to receive data signals (e.g., DOCSIS QAM signals) and video signals (e.g., video QAM signals).

In embodiments, the interleaver depth module 210 identifies an interleaver depth associated with a received signal. For example, the interleaver depth module 210 can identify the interleaver depth during an identification of error correction parameters associated with the received signal (e.g., during the acquisition of an FEC lock on the received signal). The interleaver depth can be identified from a code word contained in an FEC frame sync trailer associated with the received signal.

In embodiments, the signal filtering module 220 compares an identified interleaver depth associated with a received signal to a threshold. The threshold can be a range of interleaver depths that are expected for a downstream data signal. For example, the low end of the predetermined range can be the minimum interleaver depth for a DOCSIS QAM signal and the high end of the predetermined range can be the maximum interleaver depth for a DOCSIS QAM signal.

In embodiments, when the signal filtering module 220 determines that the identified interleaver depth associated with the received signal is outside of the predetermined range, the signal filtering module can direct the network interface 230 to drop the lock on the received signal and to search for and acquire a lock onto another downstream signal. When the signal filtering module 220 determines that the identified interleaver depth associated with the received signal is within the predetermined range, the signal can be passed onto another component of the CPE device 110 and/or the CPE device can proceed toward the process of ranging between the CPE device and a headend (e.g., headend 105). For example, when the identified interleaver depth is within the predetermined range, the CPE device 110 can acquire a transmission convergence layer (e.g., MPEG) lock on the signal and make the determination whether the signal is a DOCSIS QAM signal based on a PID associated with the signal.

Figure 3:
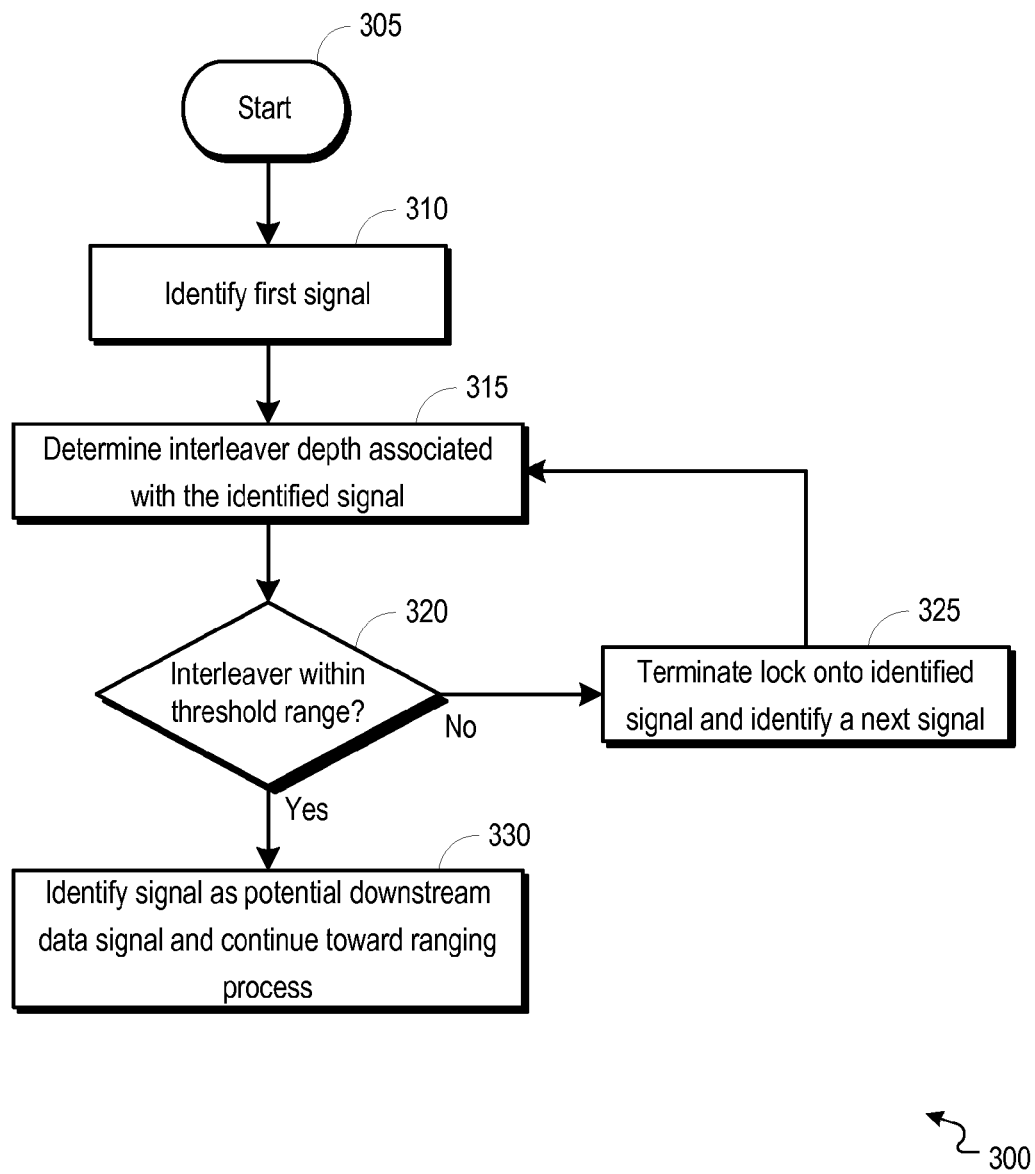
FIG. 3 is a flowchart illustrating an example process operable to distinguish video signals from data signals based upon an interleaver depth associated with the signals.

FIG. 3 is a flowchart illustrating an example process 300 operable to distinguish video signals from data signals based upon interleaver depths associated with the signals. The process 300 can begin at 305, when a CPE device 110 of FIG. 1 begins a search for a downstream signal. For example, a CPE device 110 will search for a downstream signal when the CPE device powers up, after the CPE device reboots or is reset, when the CPE device drops a connection with a downstream signal, and at other times. In embodiments, a network interface 230 of FIG. 2 can identify one or more downstream signals available to the CPE device 110.

At 310, the CPE device 110 can identify a first downstream signal. The first downstream signal can be identified, for example, by a network interface 230 of FIG. 2. In embodiments, the CPE device 110 acquires a QAM lock on a first downstream QAM signal. For example, the CPE device 110 may identify and acquire a lock onto a center frequency associated with a first downstream signal that is identified based upon frequency scanning settings at the CPE device.

At 315, an interleaver depth associated with the identified signal can be determined. The interleaver depth associated with the identified signal can be determined, for example, by an interleaver depth module 220 of FIG. 2. In embodiments, the interleaver depth associated with the identified signal can be determined during an identification of error correction parameters associated with the received signal (e.g., during the acquisition of an FEC lock on the identified signal). For example, the interleaver depth can be identified from a code word contained in an FEC frame sync trailer associated with the identified signal.

At 320, a determination can be made whether the interleaver depth associated with the identified signal is within a predetermined threshold range. In embodiments, a signal filtering module 220 compares the interleaver depth to a predetermined threshold range. The predetermined threshold range can be a range between a minimum and maximum interleaver depth that is expected for a downstream data signal (e.g., DOCSIS QAM signal).

If, at 320, the determination is made that the interleaver depth associated with the identified signal is not within the predetermined threshold range, the CPE device 110 can determine that the identified signal is not a valid downstream data signal, and the process 300 can proceed to 325. For example, when the interleaver depth associated with the identified signal is not within the predetermined threshold range, the identified signal may be a video signal. At 325, the CPE device 110 can terminate a lock onto the identified signal and can identify and lock onto a next signal. In embodiments, the CPE device 110 may terminate a lock onto an identified signal by tuning to a different frequency.

When the interleaver depth associated with the identified signal is not within the predetermined threshold range, the CPE device 110 can make the determination that the identified signal is not a data signal through which the CPE device 110 can properly receive a data service. In embodiments, the signal filtering module 220 informs the network interface 230 to terminate the QAM lock on the identified signal and to scan for another available downstream signal. The network interface 230 can then identify a next available downstream signal, and the process 300 can return to 315 where an interleaver depth associated with the next available downstream signal can be determined. It should be understood by those skilled in the relevant art that there are various methods that may be used by the CPE device 110 to identify an available downstream signal.

If, at 320, the determination is made that the interleaver depth associated with the identified signal is within the predetermined threshold range, the process 300 can proceed to 330. At 330, the CPE device 110 can determine that the identified signal may be a downstream data signal and can continue toward the ranging process. When the interleaver depth associated with the identified signal is within the predetermined threshold range, the CPE device 110 can make the determination that the identified signal may be a downstream data signal (e.g., DOCSIS QAM signal) through which the CPE device 110 can receive a data service. In embodiments, after the determination is made that the interleaver depth associated with the identified signal is within the predetermined threshold range, the CPE device 110 can acquire a transmission convergence layer (e.g., MPEG) lock on the identified signal and make a determination whether the identified signal is a data signal (e.g., DOCSIS QAM signal) based upon an identified PID associated with the identified signal.

Figure 4:
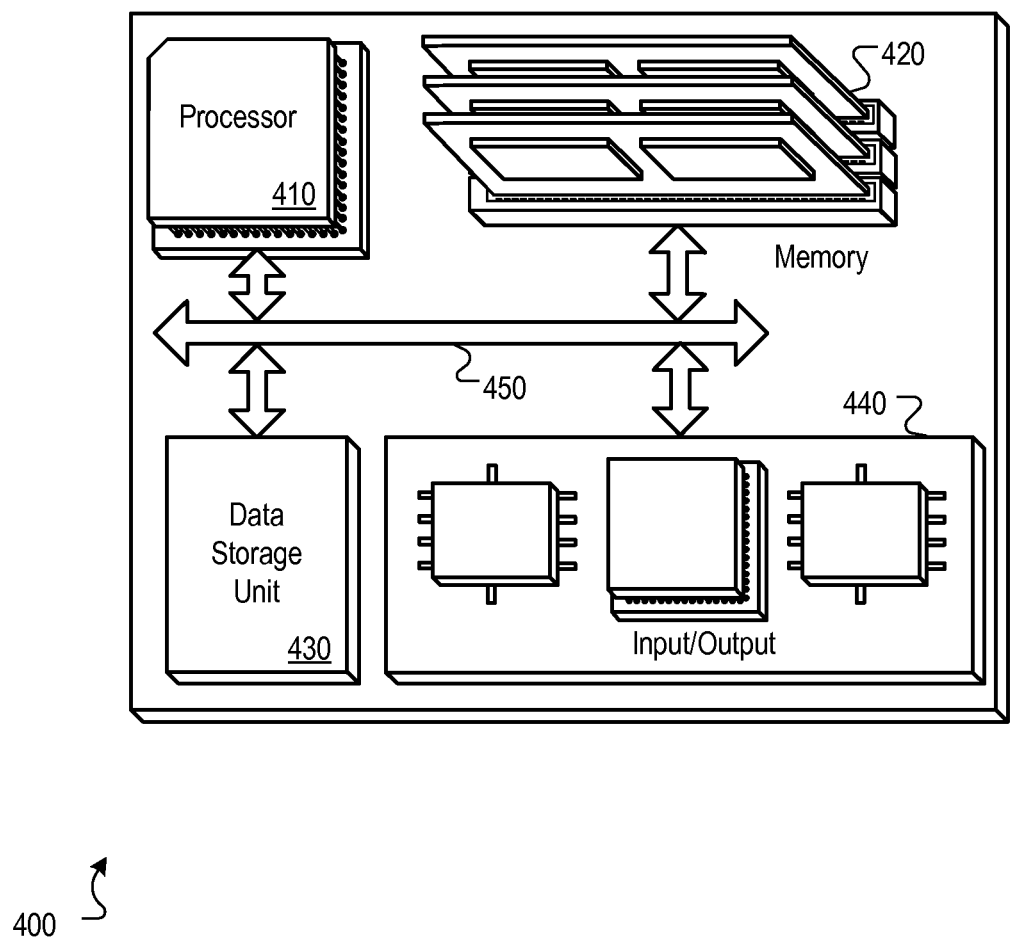
FIG. 4 is a block diagram of a hardware configuration operable to distinguish video signals from data signals based upon an interleaver depth associated with the signals.

FIG. 4 is a block diagram of a hardware configuration 400 operable to distinguish video signals from data signals based upon an interleaver depth associated with the signals. The hardware configuration 400 can include a processor 410, a memory 420, a storage device 430, and an input/output device 440. Each of the components 410, 420, 430, and 440 can, for example, be interconnected using a system bus 450. The processor 410 can be capable of processing instructions for execution within the hardware configuration 400. In one implementation, the processor 410 can be a single-threaded processor. In another implementation, the processor 410 can be a multi-threaded processor. The processor 410 can be capable of processing instructions stored in the memory 420 or on the storage device 430.

The memory 420 can store information within the hardware configuration 400. In one implementation, the memory 420 can be a computer-readable medium. In one implementation, the memory 420 can be a volatile memory unit. In another implementation, the memory 420 can be a non-volatile memory unit.

In some implementations, the storage device 430 can be capable of providing mass storage for the hardware configuration 400. In one implementation, the storage device 430 can be a computer-readable medium. In various different implementations, the storage device 430 can, for example, include a hard disk device, an optical disk device, flash memory or some other large capacity storage device. In other implementations, the storage device 430 can be a device external to the hardware configuration 400.

The input/output device 440 provides input/output operations for the hardware configuration 400. In one implementation, the input/output device 440 can include one or more of a network interface device (e.g., an Ethernet card), a serial communication device (e.g., an RS-232 port), one or more universal serial bus (USB) interfaces (e.g., a USB 2.0 port) and/or a wireless interface device (e.g., an 802.11 card). In another implementation, the input/output device can include driver devices configured to send communications to, and receive communications from one or more networks (e.g., subscriber network 125 of FIG. 1).

Those skilled in the art will appreciate that the invention improves upon methods and apparatuses for scanning for and identifying a data signal from a plurality of signals. The methods, systems, and apparatuses described in this disclosure enable the distinguishing of video signals from data signals based upon an interleaver depth associated with the signals. The distinguishing of video signals from data signals based upon interleaver depth can reduce the amount of time it takes for a CPE device to find and range to an appropriate downstream data signal.

The subject matter of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD ROM disks. The processor and the memory can be supplemented by, or incorporated in, special purpose logic circuitry.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

I claim:

1. A method comprising:
    establishing a lock onto a first frequency associated with a first signal at a customer premise equipment device;
    determining an interleaver depth associated with the first signal, wherein the interleaver depth comprises a metric identifying an extent by which one or more components carried by the first signal are divided into sub-components;
    comparing the interleaver depth associated with the first signal to a predetermined range; and
    terminating the lock on the first frequency and establishing a lock onto a next frequency associated with a next signal in response to a determination that the interleaver depth associated with the first signal is outside of the predetermined range.

2. The method of claim 1, wherein the predetermined range comprises interleaver depths that are associated with a downstream data signal.

3. The method of claim 2, wherein the lowest interleaver depth of the predetermined range comprises a minimum interleaver depth associated with a downstream data signal, and the highest interleaver depth of the predetermined range comprises a maximum interleaver depth associated with a downstream data signal.

4. The method of claim 1, wherein the interleaver depth associated with the first signal is determined from a forward error correction frame sync trailer during a forward error correction lock of the first signal.

5. The method of claim 1, wherein, when the interleaver depth associated with the first signal is outside of the predetermined range, a transmission convergence layer lock is not acquired on the first signal.

6. The method of claim 1, further comprising:
    when the interleaver depth associated with the first signal is within the predetermined range, acquiring a lock on a transmission convergence layer associated with the first signal and completing a ranging process between the customer premise equipment device and an upstream headend.

7. The method of claim 1, wherein the first signal comprises a quadrature amplitude modulation signal.

8. An apparatus comprising:
    an interface configured to establish a lock onto a first frequency associated with a first signal; and
    one or more modules that:
        determine an interleaver depth associated with the first signal, wherein the interleaver depth comprises a metric identifying an extent by which one or more components carried by the first signal are divided into sub-components;
        compare the interleaver depth associated with the first signal to a predetermined range; and
            cause the interface to terminate the lock on the first frequency and establish a lock onto a next frequency associated with a next signal in response to a determination that the interleaver depth associated with the first signal is outside of the predetermined range.

9. The apparatus of claim 8, wherein the predetermined range comprises interleaver depths that are expected of a downstream data signal.

10. The apparatus of claim 9, wherein the lowest interleaver depth of the predetermined range comprises a minimum interleaver depth associated with a downstream data signal, and the highest interleaver depth of the predetermined range comprises a maximum interleaver depth associated with a downstream data signal.

11. The apparatus of claim 8, wherein the interleaver depth associated with the first signal is determined from a forward error correction frame sync trailer during a forward error correction lock of the first signal.

12. The apparatus of claim 8, wherein, when the interleaver depth associated with the first signal is outside of the predetermined range, a transmission convergence layer lock is not acquired on the first signal.

13. The apparatus of claim 8, wherein the one or modules further cause a lock on a transmission convergence layer associated with the first signal to be acquired and a ranging process between the apparatus and an upstream headend to be completed when the interleaver depth associated with the first signal is within the predetermined range.

14. One or more non-transitory computer readable media having instructions operable to cause one or more processors to perform the operations comprising:
    establishing a lock onto a first frequency associated with a first signal at a customer premise equipment device;
    determining an interleaver depth associated with the first signal, wherein the interleaver depth comprises a metric identifying an extent by which one or more components carried by the first signal are divided into sub-components;

comparing the interleaver depth associated with the first signal to a predetermined range; and terminating the lock on the first frequency and establishing a lock onto a next frequency associated with a next signal in response to a determination that the interleaver depth associated with the first signal is outside of the predetermined range.

15. The one or more non-transitory computer-readable media of claim 14, wherein the predetermined range comprises interleaver depths that are expected of a downstream data signal.

16. The one or more non-transitory computer-readable media of claim 15, wherein the lowest interleaver depth of the predetermined range comprises a minimum interleaver depth associated with a downstream data signal, and the highest interleaver depth of the predetermined range comprises a maximum interleaver depth associated with a downstream data signal.

17. The one or more non-transitory computer-readable media of claim 14, wherein the interleaver depth associated with the first signal is determined from a forward error correction frame sync trailer during a forward error correction lock of the first signal.

18. The one or more non-transitory computer-readable media of claim 14, wherein, when the interleaver depth associated with the first signal is outside of the predetermined range, a transmission convergence layer lock is not acquired on the first signal.

19. The one or more non-transitory computer-readable media of claim 14, wherein the instructions are further operable to cause one or more processors to perform the operations comprising:

acquiring a lock on a transmission convergence layer associated with the first signal and completing a ranging process between the customer premise equipment device and an upstream headend in response to a determination that the interleaver depth associated with the first signal is within the predetermined range.

20. The one or more non-transitory computer-readable media of claim 14, wherein the signal comprises a quadrature amplitude modulation signal.

* * * * *